United States Patent [19]

Cross, Jr.

[11] Patent Number: 4,754,864

[45] Date of Patent: Jul. 5, 1988

[54] BIN INFEED SYSTEM FOR SURGE OR BLENDING BINS OR THE LIKE

[75] Inventor: Wiley E. Cross, Jr., Glen Allen, Va.

[73] Assignee: The Cardwell Machine Company, Richmond, Va.

[21] Appl. No.: 4,704

[22] Filed: Jan. 20, 1987

[51] Int. Cl.[4] .............................................. B65G 37/00
[52] U.S. Cl. .................................... 198/364; 198/526; 37/217
[58] Field of Search ....................... 198/364, 526, 535; 37/214, 215, 217

[56] References Cited

U.S. PATENT DOCUMENTS

| 2,099,071 | 11/1937 | Lundbye | 198/364 |
| 4,213,525 | 7/1980 | Scheppele | 198/364 |
| 4,381,733 | 5/1983 | Patz et al. | 198/364 X |
| 4,381,734 | 5/1983 | Patz et al. | 198/364 X |

FOREIGN PATENT DOCUMENTS 590212 1/1978 U.S.S.R. .............................. 198/364

Primary Examiner—Robert J. Spar
Assistant Examiner—Jennifer Doyle
Attorney, Agent, or Firm—Mason, Fenwick & Lawrence

[57] ABSTRACT

A bin infeed system for a surge or blending bin or the like including an endless belt trained about a pair of rolls at opposite ends of the bin, a track assembly providing a pair of transversely spaced tracks longitudinally spanning the bin laterally flanking and below the belt movable longitudinally over the upper surface of the upper flight of the conveyor belt and a movable plow assembly including a plow carriage having a carriage frame and wheels rolling on the tracks, and a V-shaped blade member rigidly fixed to the carriage frame and having its apex aligned substantially with the center line of the belt. A pair of wing-like diverter members extend below and from the opposite sides of the carriage providing downwardly and outwardly inclined plate portions of substantially L-shaped cross-section opening toward one end of the bin with the bottom plate portion having a rearwardly inclined front edge.

12 Claims, 6 Drawing Sheets

BIN INFEED SYSTEM FOR SURGE OR BLENDING BINS OR THE LIKE

BACKGROUND AND OBJECTS OF THE INVENTION

The present invention relates in general to a conveyor belt type system for feeding material into a surge or blending bin enabling one to fill the bin to a reasonably constant elevation in both the transverse or longitudinal directions to a specified height, and more particularly to a conveyor infeed system for surge or blending bins having a belt conveyor without sides located longitudinally along the bin center line and a movable blade to plow the material off of both sides of the belt to promote reasonably even distribution across the section of the bin.

Storage of material in a surge or blending bin in order to be efficient should fill the bin to as constant an elevation as possible in both the transverse and longitudinal directions and to a specified height. This insures the maximum volume may be stored in the bin. Additionally, the material should be introduced into the bin in a gentle manner to reduce breakage. Since the amount of material in the bin at any one time changes, the point of introduction of new material must be able to change position easily and automatically.

Multiple installations make low initial cost and low maintenance costs very important. Particularly in the food industry a simple and open design is preferred to facilitate cleaning and reduce accumulations of material and dust.

A wide variety of feeding methods are now being used. Some examples are oscillating vibratory and belt conveyors which swing from side to side and must be positioned by sensing the stored material so as to move longitudinally. Other methods use two reciprocating belt conveyors, usually a full width longitudinal belt and a narrow transverse belt to load the longitudinal belt. Some position a screw auger above the bin and auger the material lengthwise using the stored material as a screw conveyor trough moving the new material to be stored from the discharge end back.

Another infeed method is to use a belt conveyor mounted longitudinally along the side of the bin and so configured that the upper surface passes around movable rollers so that it may discharge onto another conveyor which also moves with the stored material face and is positioned transverse to the bin. This second conveyor is usually a vibrating pan with a bias discharge, or could be a reciprocating belt conveyor.

Another type uses a belt conveyor without sides mounted longitudinally along the side of the bin. A blade mounted above the belt at an angle moves in response to the location of the stored material to plow the incoming material off of the belt into a vibrating conveyor mounted transverse to the bin and having a bias opening in its trough as above and moving on rails with the plow.

In all but one of these methods a heavy transverse or oscillating conveyor must move with the rear face of the stored material which requires heavy tracks, a driving motor or motors which must be supplied power by a festoon or other movable power supply systems. In addition, bias slots are difficult to adjust properly for even distribution when the product is introduced by a belt from right angles and close coupled.

An object of the present invention is the provision of a light weight belt conveyor without sides, for a surge or blending bin or the like, wherein the belt conveyor is located longitudinally along the bin center line and extends slightly beyond the bin at both ends, for feeding particulate material to the bin to a reasonably constant elevation in both the transverse and longitudinal directions, and including a movable blade which plows the material off of both sides of the belt onto diverters or slides for evenly distributing the material across the section of the bin.

Another object of the present invention is a provision of a bin infeed system as described in the immediately preceding paragraph, which distributes the incoming material gently so as to reduce breakage and utilizes only one fixed conveyor rather than one or more movable conveyors, and does not require a portable electric supply system.

Another object of the present invention is the provision of a bin infeeding system as described in the two immediately preceding paragraphs, wherein the infeed material is transferred to a moving belt only once and therefore is subject to less breakage, and wherein the bin infeed system has no vibrating parts to transmit vibrations to the bin or building structure and does not require heavy rails for the support of the apparatus for diverting the material from the conveyor belt surface into the bin.

Other objects, advantages and capabilities of the present invention will become apparent from the following detailed description, taking in conjunction with the accompanying drawings illustrating a preferred embodiment of the invention.

DETAILED DESCRIPTION OF A PREFERRED EMBODIMENT

Figure 1:
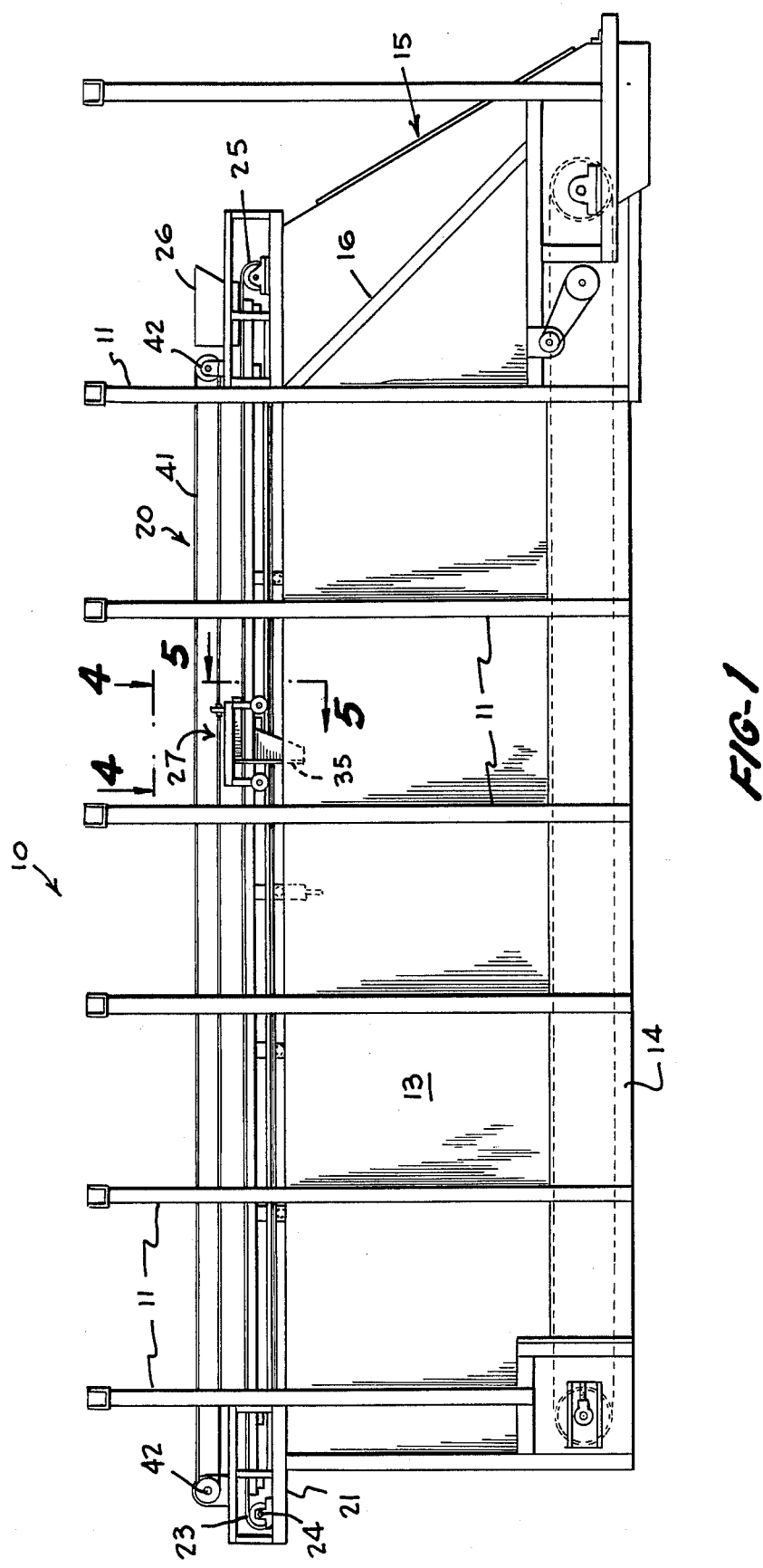
FIG. 1 is a side elevation view of a surge bin having a bin infeed system of the present invention, including the conveyor belt and moveable blade plow and distributor means of the present invention.

Referring to the drawings, wherein like reference characters designate corresponding parts throughout the several figures, there is illustrated in FIG. 1 a typical surge bin or blending bin, indicated by the reference character 10, having upright, vertically extending frame members 11 and associated horizontal frame members 12 providing support for vertical side walls 13 and a bottom wall 14. The surge bin or blending bin 10 has an inclined discharge chute formation 15 having a discharge assist apron 16, for example, driven by an electrical motor 17 and associated reduction gear system 18 carried on an outboard supporting bracket or shelf structure 19.

Figure 6:
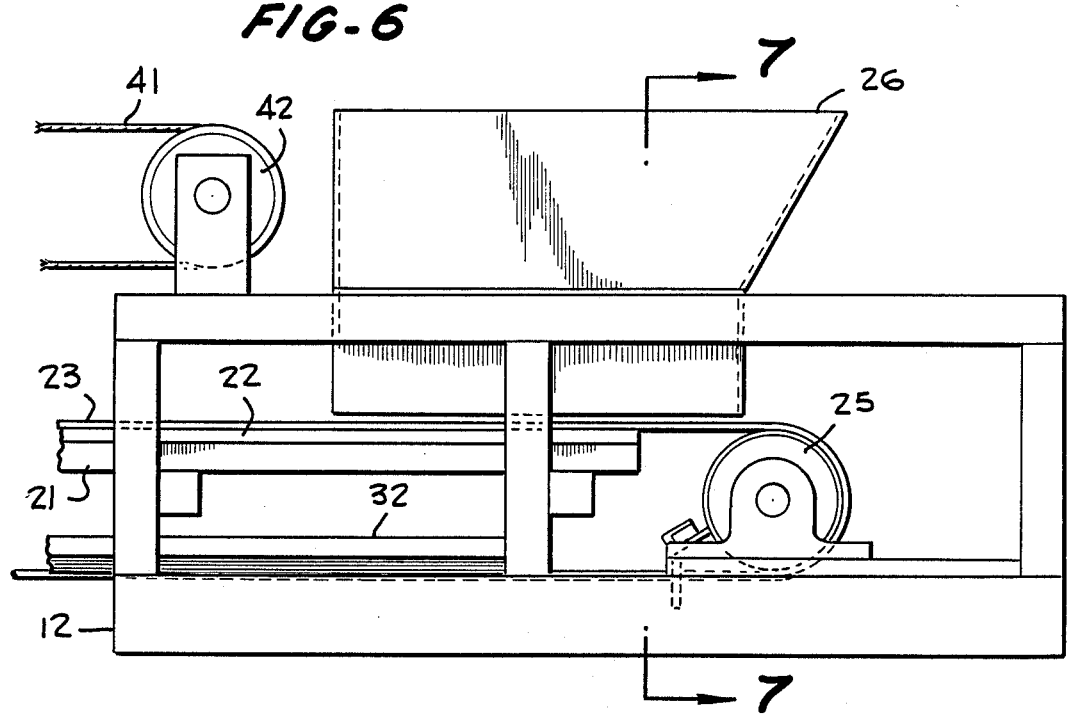
FIG. 6 is a fragmentary side elevation view, to enlarge the scale, of the feed end of the conveyor belt and infeed hopper portions.
Figure 8:
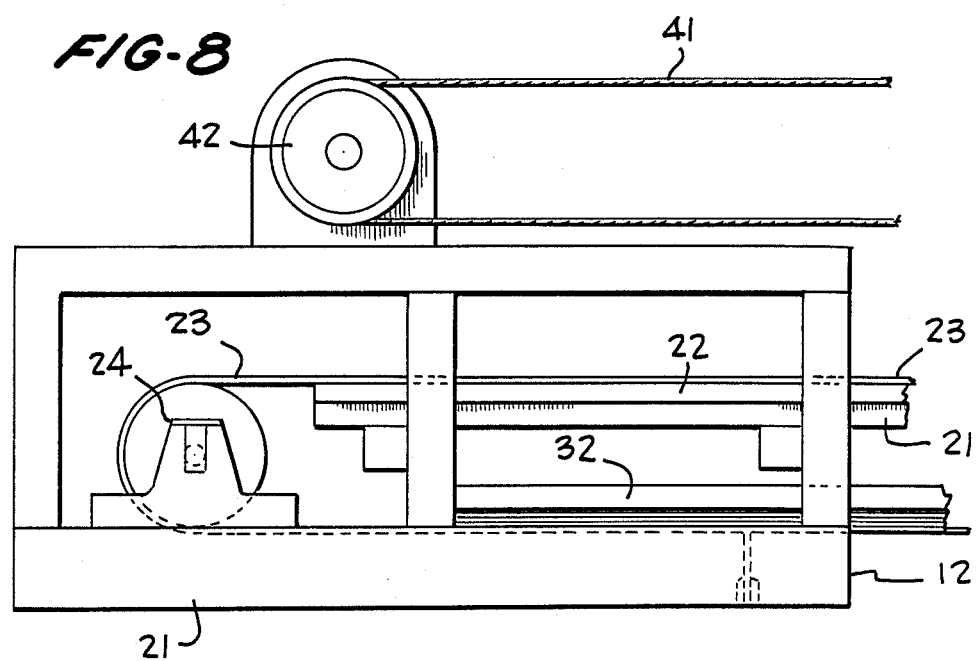
FIG. 8 is a fragmentary enlarged side elevational view of the drive end of the conveyor portion.

The upper region of the bin 10 is provided with the infeed conveyor system of the present invention, indicated generally by the reference character 20, which includes a frame 21 and a fixed bed 22 on which the endless belt 23 slides (see FIG. 6). The belt is driven by a motorized head roller 24, or the roller 24 may be driven by an external motor, and the belt tension is maintained by an idle roller 25, the belt being trained around both the drive roller 24 and the idle roller 25 located at opposite ends of the belt 23. In the example herein illustrated, a hopper 26 is provided into which the infeed material is fed and contained toward the center of the belt 23.

A gantry type movable blade and diverter discharge device, indicated at 27, includes a frame 28 formed of longitudinal frame members 29 and transverse frame members 29a is movably supported by rollers 30 having, for example, roller shafts 31 journaled in the longitudinal frame members 28 and rolling on rigid longitudinally extending tracks or frame members 32. A V-shaped blade 33 formed of forwardly converging flat plates 34, 34a converging toward the chute end of the bin are rigidly fixed, as by welding or the like, to the frame members 29 and 29a and are positioned immediately above the surface of the upper flight of the endless belt 23 to plow the infeed material to either side of the belt and over the sides of the belt onto diverter plates 35. The diverter plates 35 act as a guard to protect the track or frame members 32 from the infeed material and cause the infeed material to spread over each half of the bin width.

Figure 2:
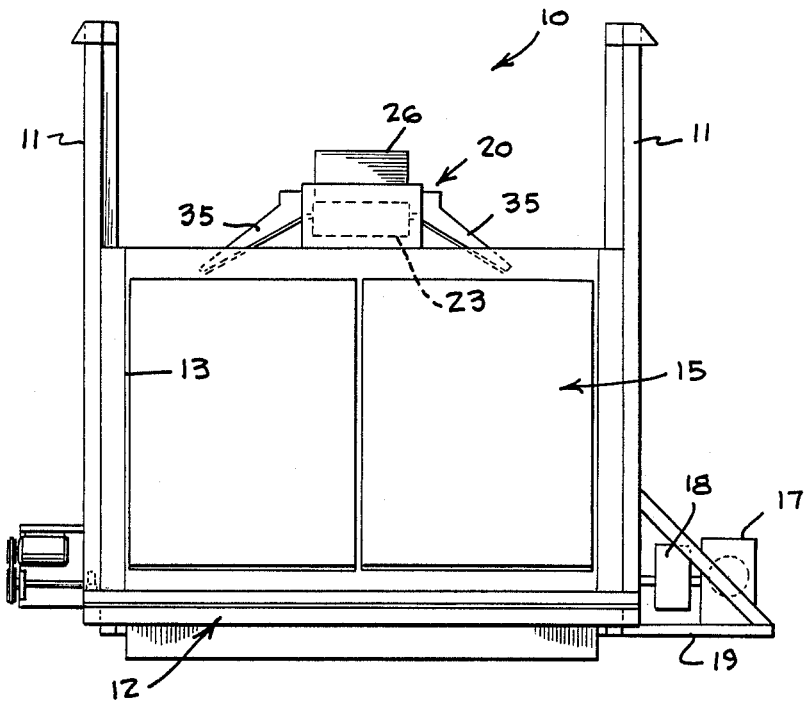
FIG. 2 is an end elevation view of the surge bin shown in FIG. 1, viewed from the right hand of FIG. 1.
Figure 7:
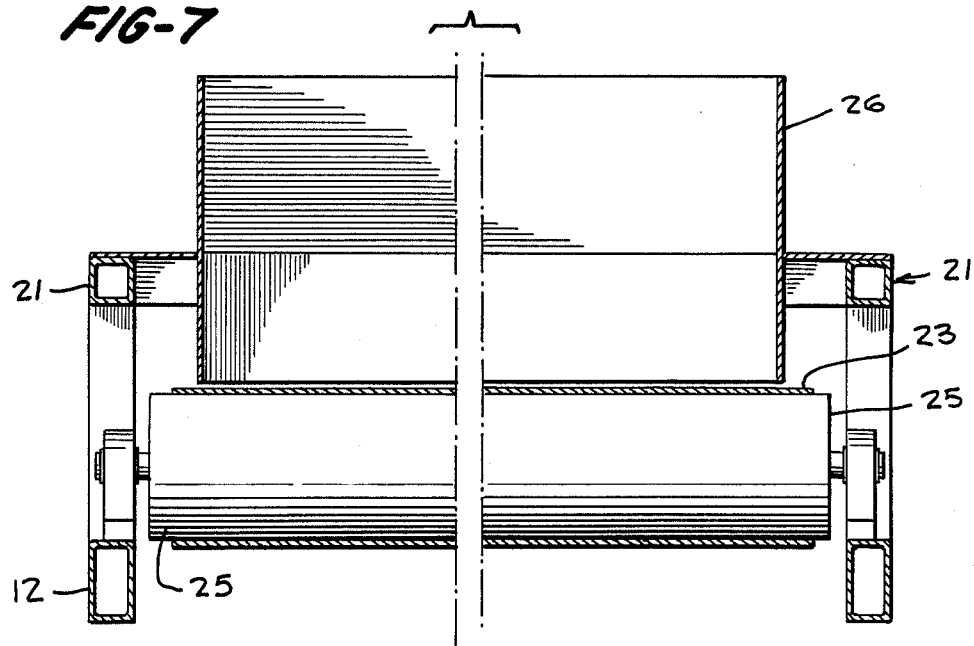
FIG. 7 is a fragmentary vertical section view taken along the line 7—7 of FIG. 6.
Figure 3:
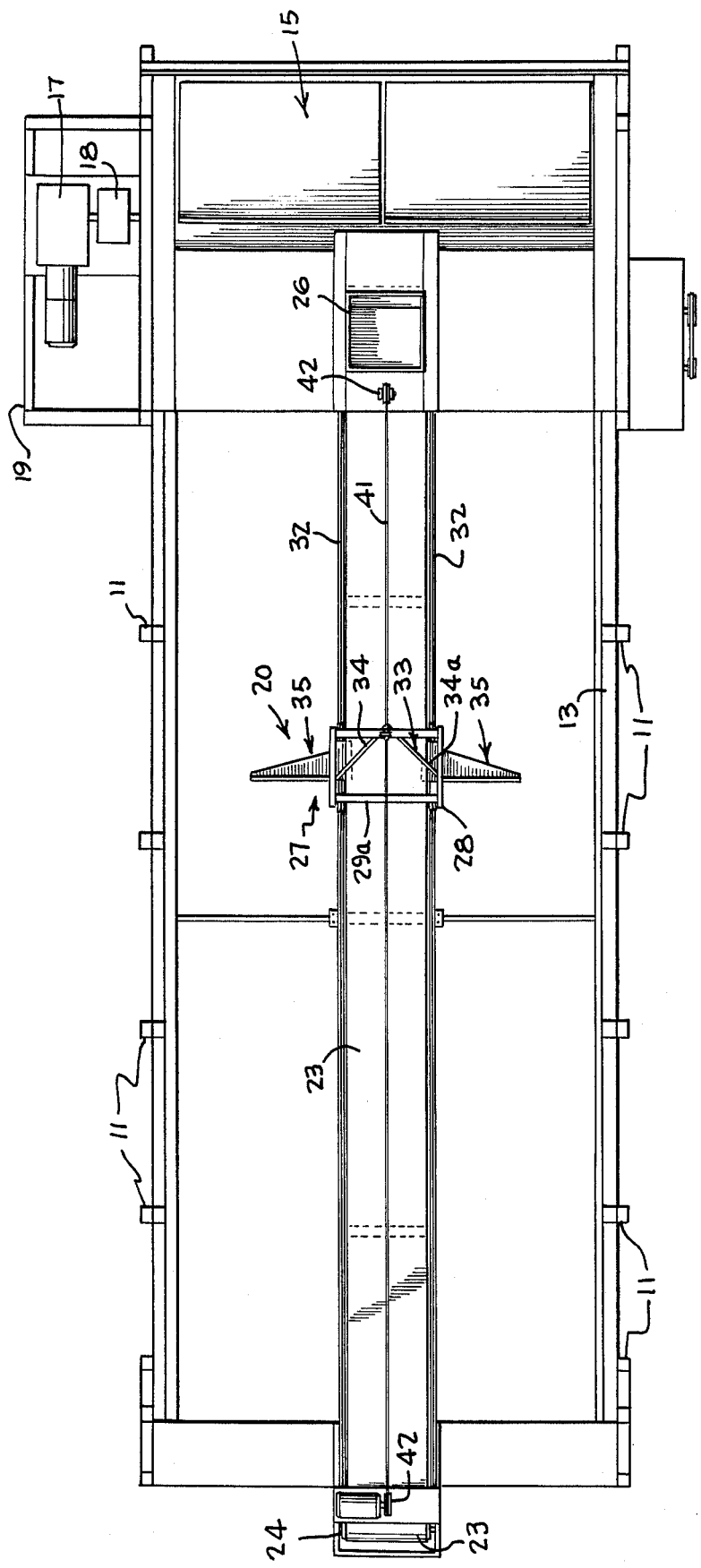
FIG. 3 is a top plan view of the surge bin and infeed conveyor system.
Figure 4:
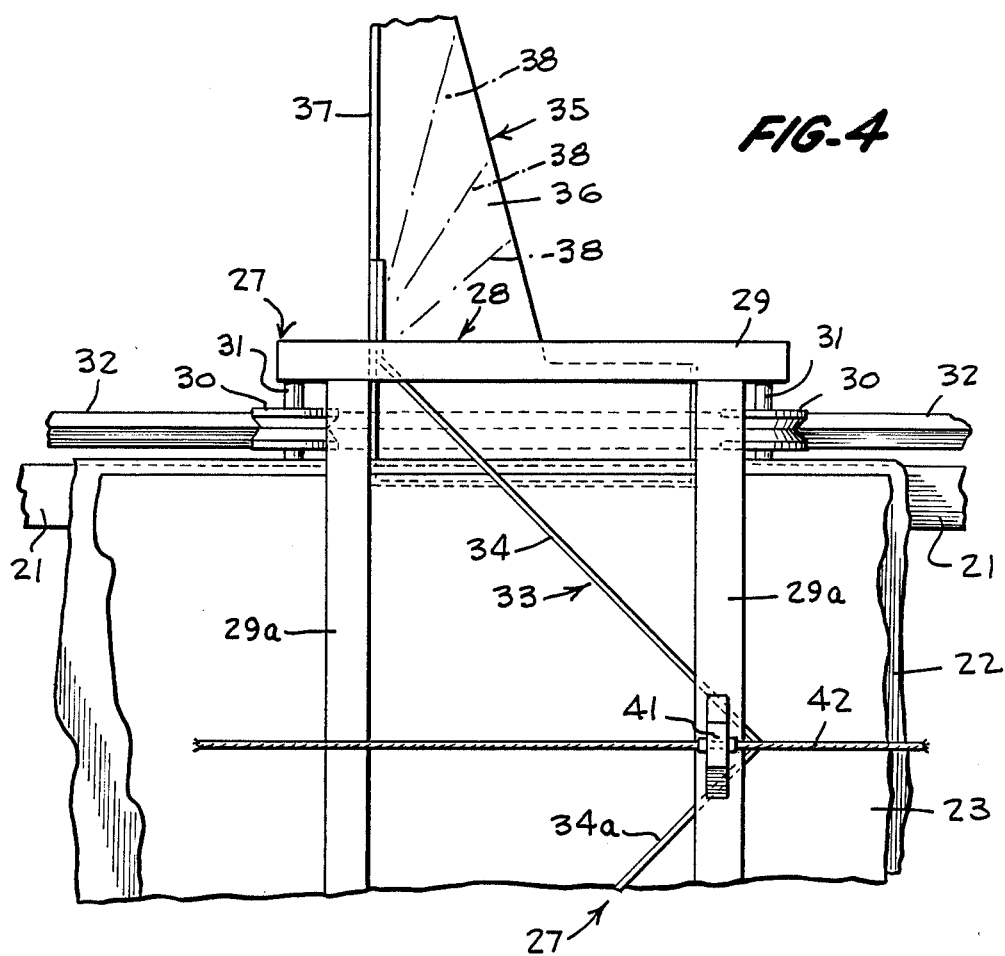
FIG. 4 is a fragmentary top plan view, to an enlarged scale, of the rolling diverter assembly associated with the conveyor belt, taken along the line 4—4 of FIG. 1.
Figure 5:
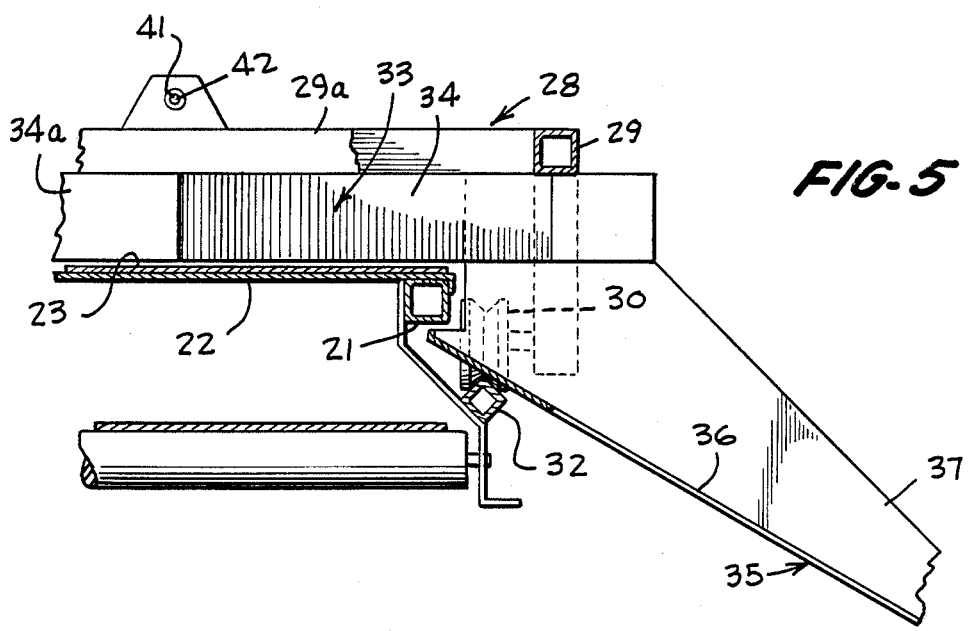
FIG. 5 is a fragmentary vertical section view taken along the lines 5—5 of FIG. 1.

The diverter plates 35 in the illustrated embodiment are of L-shaped or right angle cross section whereby the two laterally extending diverter plate formations 35 have respective bottom plates 36 which lie in a pair of downwardly diverging radial planes of a longitudinal horizontal axis of the vertical longitudinal center plane of the bin and provide vertical back wall portions or shoulder plate formations 37 of truncated triangular shape as shown in FIGS. 2 and 5 lying in a common transverse vertical plane of the bin. If desired, the diverters 35 may be equipped with ridges as illustrated in broken lines at 38 in FIG. 4 which enhance the distribution.

Figure 9:
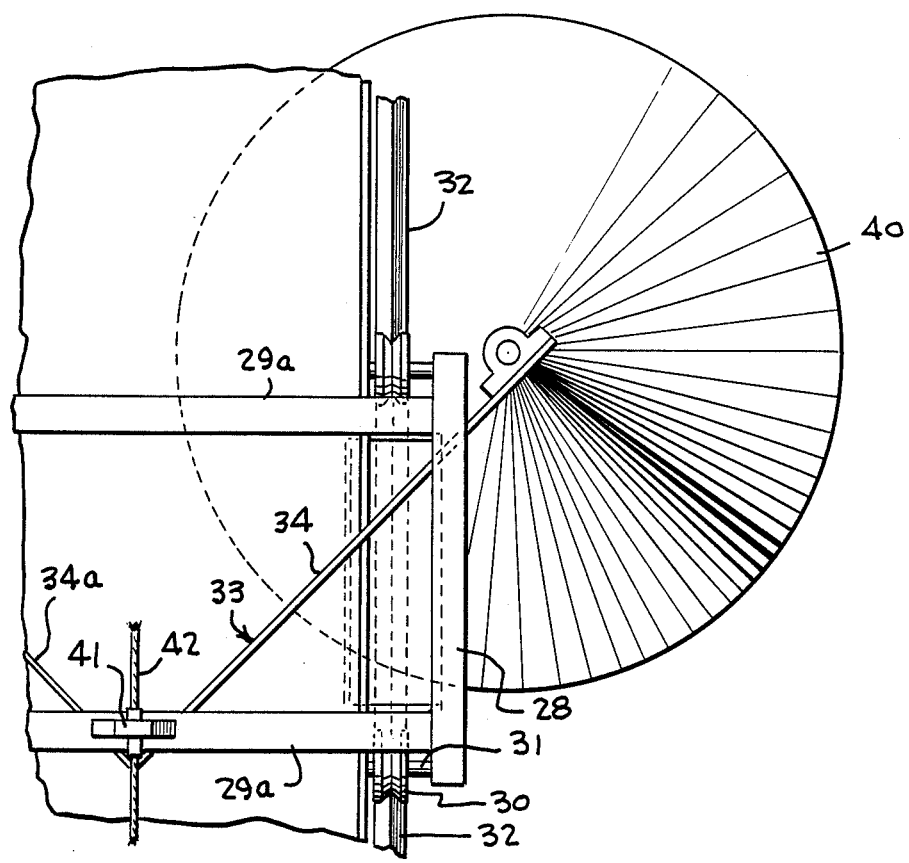
FIGS. 9 and 10 are fragmentary top plan and front elevation views of an alternative diverter arrangement.
Figure 10:
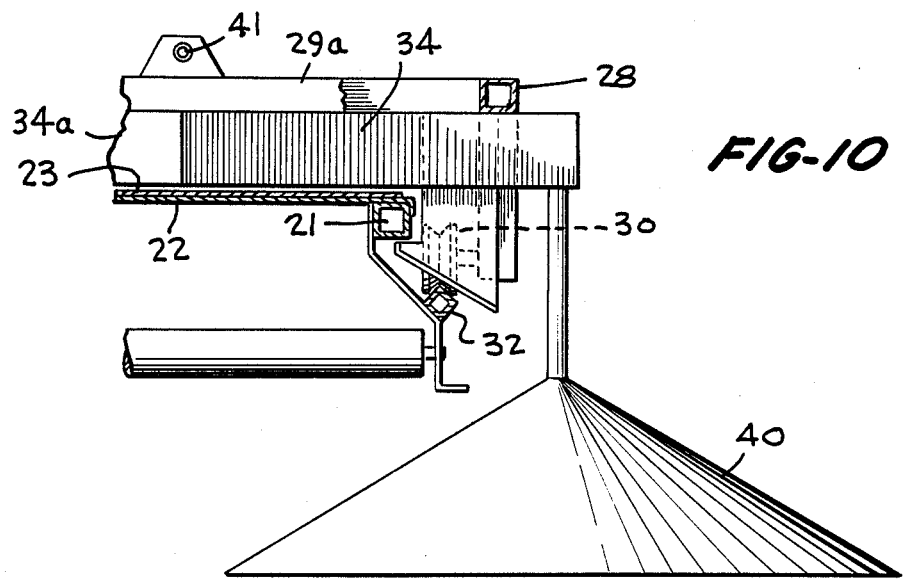

While rigid diverters fixed to and carried by the frame of the plow blade and diverter device 27 may be provided, the fixed diverters of FIGS. 1 through 8 may be dispensed with and replaced by conical dish like diverters, indicated by reference character 40 in FIGS. 9 and 10, which may either be fixed or slowly rotating (driven by a pulley and belt drive from a drive motor carried on the frame 28) positioned so that the material diverted off of the lateral edges of the belt 23 by the plow blades 34, 34a fall onto the upwardly facing surface of the associated conical dish 40 to distribute the material through the bin.

The gantry type blade and diverter device 27 is moved in response to the position of the material pile in a known manner by a tension cable 41 supported by pulleys 42 at opposite ends of the frame structure formed by the track or frame members 32 of the conveyor assembly and powered by a drive motor 43.

By the above described construction, a novel bin infeed system is provided which mounts above the longitudinal bin center line and is fixed to the bin structure and carries a movable blade which plows the infeed material to each side of the conveyor belt and thence over diverter plates to distribute the incoming material evenly over the cross section of the bin. This bin infeed system distributes the incoming material gently so as to reduce breakage and utilizes only one fixed conveyor rather than one or more movable conveyors. This design is such that it does not require a portable electric supply system and the driving arrangement is simplified by using a driving roller which contains the motor and eliminates belts and pulleys for a more sanitary installation.

The bin infeed system as above described enables one to employ a lightweight gantry and plow blade riding on the conveyor frame and driven by a fixed electric motor mounted outside the bin. It has no vibrating parts to transmit vibration to the bin or building structure and does not require heavy rails for support of the pile seeking portion of the system. In the above described bin infeed system, the belt conveyor portion has only a stationary head roll and stationary tail roll and return idles and does not require additional movable rollers for the pile seeking and unloading portion. Furthermore, the infeed material is transferred to the moving belt only once and therefore is subject to less breakage than where plural transfers occur.

I claim:

1. A bin infeed system for a surge or blending bin or the like having a belt conveyor including a pair of rolls at opposite longitudinal ends of the bin and an endless belt trained about said rolls and defining a horizontal upper flight providing an upwardly facing deposit upper surface to receive particulate material thereon bounded laterally by opposite side edges lying in the horizontal plane of said upper flight at opposite sides thereof, a track assembly including a stationary frame and a pair of transversely spaced elongated track members longitudinally spanning the bin; a horizontal plow assembly movable from end to end longitudinally immediately over said upper surface to plow the material off of both sides of the belt upper flight for discharge into the bin to a relatively constant elevation in both transverse and longitudinal directions, comprising a reciprocative plow carriage including a carriage frame and wheels mounted for rotation thereon and supported in rolling relation on the track members, a V-shaped blade member formed of flat blade plates converging toward one end of the bin and joined at an apex substantially at the longitudinal center line of the belt upper flight, the flat blade plates being rigidly fixed to the carriage frame and extending from said apex to just beyond the side edges of the belt having lower edges lightly engaging said upper surface to plow the material deposited thereon off of both sides of the belt, wing-like diverter members at each respective side of the belt carried by said frame and having a downwardly and outwardly inclined diverter plate portion underlying the adjacent edge of the belt and the outer end portion of the adjacent blade plate and overlying the adjacent track member to divert material plowed off of the belt upper flight from falling on the track members and to cause the material to spread over the adjacent half of the bin width, and means for moving the plow carriage along the length of said track members, said wing like diverter members each being of substantially L-shaped cross-section formed of a laterally extending vertical diverter back plate together with a bottom plate joining the back plate at the lower end of the back plate and lying in a downwardly and outwardly inclined plane, the bottom plates of the diverter members having upwardly facing surface portions disposed to receive material plowed off the sides of said belt upper flight by said V-shaped blade member and having a truncated right triangle shape defining a rearwardly inclined front edge and a back edge joined to the associated back plate with the inclined front edge converging to a location close to said rear edge.

2. A bin infeed system as defined in claim 1, wherein the means for moving the plow carriage along the track members includes a tension cable supported by pulleys at opposite ends of the track members and connected to the frame of the plow carriage and a drive motor for moving the tension cable.

3. A bin infeed system as defined in claim 1 wherein said pair of rolls for the endless belt comprise an idle roller and a drive roller about which the belt is trained, and motor means for driving said drive roller to drive the belt in either direction for moving material on the upper plate thereof along the length of the bin.

4. A bin infeed system as defined in claim 2, wherein said pair of rolls for the endless belt comprise an idle roller and a drive roller about which the belt is trained, and motor means for driving said drive roller to drive the belt in either direction for moving material on the upper plate thereof along the length of the bin.

5. A bin infeed system as defined in claim 1, wherein said carriage frame is a rectangular frame formed of transverse and longitudinal rigid frame members fixed together at their ends, depending shaft supporting leg members extending downwardly therefrom having a pair of parallel horizontal shafts carried thereby spaced from each other longitudinally of the bin and spanning a distance slightly greater than the width of the belt, said wheels being mounted on said shafts and rolling on said track members, said shafts being located below the upper flight of said belt and the depending leg members being of a height to support said V-shaped blade member at a level immediately above said upper flight.

6. A bin infeed system as defined in claim 2, wherein said carriage frame is a rectangular frame formed of transverse and longitudinal rigid frame members fixed together at their ends, depending shaft supporting leg members extending downwardly therefrom having a pair of parallel horizontal shafts carried thereby spaced from each other longitudinally of the bin and spanning a distance slightly greater than the width of the belt, said wheels being mounted on said shafts and rolling on said track members, said shafts being located below the upper flight of said belt and the depending leg members being of a height to support said V-shaped blade member at a level immediately above said upper flight.

7. A bin infeed system as defined in claim 3, wherein said carriage frame is a rectangular frame formed of transverse and longitudinal rigid frame members fixed together at their ends, depending shaft supporting leg members extending downwardly therefrom having a pair of parallel horizontal shafts carried thereby spaced from each other longitudinally of the bin and spanning a distance slightly greater than the width of the belt, said wheels being mounted on said shafts and rolling on said track members, said shafts being located below the upper flight of said belt and the depending leg members being of a height to support said V-shaped blade member at a level immediately above said upper flight.

8. A bin infeed system as defined in claim 4, wherein said carriage frame is a rectangular frame formed of transverse and longitudinal rigid frame members fixed together at their ends, depending shaft supporting leg members extending downwardly therefrom having a pair of parallel horizontal shafts carried thereby spaced from each other longitudinally of the bin and spanning a distance slightly greater than the width of the belt, said wheels being mounted on said shafts and rolling on said track members, said shafts being located below the upper flight of said belt and the depending leg members being of a height to support said V-shaped blade member at a level immediately above said upper flight.

9. A bin infeed system as defined in claim 1, including a upwardly opening hopper disposed adjacent one end of said bin having an open bottom overlying an end portion of the upper flight of said belt for receiving infeed material and discharging the same gravitationally onto said belt adjacent said one end thereof.

10. A bin infeed system as defined in claim 4, including a upwardly opening hopper disposed adjacent one end of said bin having an open bottom overlying an end portion of the upper flight of said belt for receiving infeed material and discharging the same gravitationally onto said belt adjacent said one end thereof.

11. A bin infeed system as defined in claim 7, including a upwardly opening hopper disposed adjacent one end of said bin having an open bottom overlying an end portion of the upper flight of said belt for receiving infeed material and discharging the same gravitationally onto said belt adjacent said one end thereof.

12. A bin infeed system as defined in claim 8, including a upwardly opening hopper disposed adjacent one end of said bin having an open bottom overlying an end portion of the upper flight of said belt for receiving infeed material and discharging the same gravitationally onto said belt adjacent said one end thereof.

* * * * *